United States Patent
Chen et al.

(10) Patent No.: US 10,086,859 B2
(45) Date of Patent: Oct. 2, 2018

(54) TROLLEY FOR CARRYING ITEMS

(71) Applicant: CHIGOO INTERACTIVE TECHNOLOGY CO., LTD., Wuxi, Jiangsu (CN)

(72) Inventors: Tao Chen, Wuxi (CN); Chuanrong Pan, Wuxi (CN); Rong Han, Wuxi (CN)

(73) Assignee: CHIGOO INTERACTIVE TECHNOLOGY CO., LTD., Wuxi, Jiangsu (CN)

( * ) Notice: Subject to any disclaimer, the term of this patent is extended or adjusted under 35 U.S.C. 154(b) by 0 days.

(21) Appl. No.: 15/521,494

(22) PCT Filed: Oct. 28, 2015

(86) PCT No.: PCT/CN2015/093088
§ 371 (c)(1),
(2) Date: Apr. 24, 2017

(87) PCT Pub. No.: WO2016/066103
PCT Pub. Date: May 6, 2016

(65) Prior Publication Data
US 2017/0305450 A1    Oct. 26, 2017

(30) Foreign Application Priority Data
Oct. 31, 2014   (CN) .................... 2014 2 0646630 U

(51) Int. Cl.
*B62B 3/02*     (2006.01)
*B62B 3/14*     (2006.01)

(52) U.S. Cl.
CPC .............. *B62B 3/02* (2013.01); *B62B 3/1424* (2013.01); *B62B 2205/30* (2013.01)

(58) Field of Classification Search
CPC ..... B62B 1/002; B62B 3/1408; B62B 5/0026; B62B 7/10; B62B 9/26; B62B 7/08; B62B 3/106; B62B 3/02
See application file for complete search history.

(56) References Cited

U.S. PATENT DOCUMENTS

| | | | |
|---|---|---|---|
| 3,782,746 A | 1/1974 | Isaacs | |
| 3,840,242 A | 10/1974 | Craig, Sr. et al. | |
| (Continued) | | | |

FOREIGN PATENT DOCUMENTS

| | | |
|---|---|---|
| CN | 2714403 Y | 8/2005 |
| CN | 201472429 U | 5/2010 |
| (Continued) | | |

OTHER PUBLICATIONS

International Search Report for PCT/CN2015/093088, ISA/CN, Haidian District, Beijing, dated Feb. 4, 2016.
(Continued)

*Primary Examiner* — Hau V Phan
(74) *Attorney, Agent, or Firm* — Stephen T. Olson; Harness, Dickey & Pierce, P.L.C.

(57) ABSTRACT

Disclosed is a trolley for carrying articles, including a base for carrying articles with wheels; a trolley frame fixedly connected to the base and extending upwards, the trolley frame forming a baffle at the front side of the base, the trolley frame including an upper portion, a middle portion and a lower portion, wherein the lower portion is connected to the front end of the base, the middle portion is provided with a foldable storage unit, and the upper portion is provided with a handle; and the base and the trolley frame form a carrying space, the foldable storage unit is provided with a retracted location and an unfolded location at which a storage space formed by the foldable storage unit occupies a part of the carrying space. A user may decide to unfold or (Continued)

retract the storage unit as necessary to properly place the articles being carried.

12 Claims, 7 Drawing Sheets

(56) References Cited

U.S. PATENT DOCUMENTS

| | | | | |
|---|---|---|---|---|
| D263,456 S * | 3/1982 | Muellner | ................ | D34/18 |
| 6,003,894 A * | 12/1999 | Maher | ................ | B62B 3/106 |
| | | | | 248/100 |
| 6,523,840 B1 * | 2/2003 | Koppes | ................ | B62B 3/144 |
| | | | | 280/33.991 |
| D606,722 S * | 12/2009 | Walter | ................ | D34/12 |
| 7,886,377 B2 * | 2/2011 | Hamberg | ................ | A61G 7/0528 |
| | | | | 5/600 |
| 8,191,909 B2 * | 6/2012 | Livengood | ................ | A61H 3/04 |
| | | | | 188/19 |
| 8,208,014 B2 * | 6/2012 | Geiger | ................ | B62B 3/1408 |
| | | | | 348/61 |
| 8,371,404 B2 * | 2/2013 | Boeckler | ................ | B62B 1/002 |
| | | | | 180/214 |
| 8,657,304 B1 * | 2/2014 | Fredendall | ................ | B62B 3/144 |
| | | | | 280/33.993 |
| 8,662,218 B1 * | 3/2014 | Horn | ................ | B62D 51/02 |
| | | | | 180/14.2 |
| 8,730,041 B2 * | 5/2014 | Roberts | ................ | G08B 13/08 |
| | | | | 340/539.12 |
| 9,561,817 B2 * | 2/2017 | Laffan | ................ | B62B 9/26 |
| 2006/0125211 A1 * | 6/2006 | Jane Santamaria | ..... | B62B 7/068 |
| | | | | 280/643 |
| 2009/0315300 A1 * | 12/2009 | Stiba | ................ | B62B 7/10 |
| | | | | 280/648 |
| 2012/0319371 A1 * | 12/2012 | Joubert | ................ | B62B 7/08 |
| | | | | 280/47.35 |
| 2015/0217792 A1 * | 8/2015 | Stiba | ................ | B62B 7/008 |
| | | | | 280/650 |

FOREIGN PATENT DOCUMENTS

| | | |
|---|---|---|
| CN | 201882122 U | 6/2011 |
| CN | 204161409 U | 2/2015 |
| DE | 2263162 A1 | 7/1973 |

OTHER PUBLICATIONS

Written Opinion of the ISA for PCT/CN2015/093088, ISA/CN, Haidian District, Beijing, dated Feb. 4, 2016.

* cited by examiner

TROLLEY FOR CARRYING ITEMS

CROSS-REFERENCE TO RELATED APPLICATIONS

This application is a 371 U.S. National Stage of International Application No. PCT/CN2015/093088, filed Oct. 28, 2015, which claims the benefit of and priority to Chinese Patent Application No. 201420646630.1, filed Oct. 31, 2014. The disclosures of the above applications are incorporated herein by reference.

TECHNICAL FIELD

The present invention relates to vehicle devices, and in particular to a trolley with a foldable storage unit.

BACKGROUND

In public occasions with large areas and complex environment such as airports, since the indication identifications are very complicated, people cannot accurately find and rapidly reach the destination. Currently, small vehicles such as multimedia trolleys with intelligent mobile service terminals are put in public occasions for people to use. These multimedia trolleys can help people carry articles and rapidly guide people to the destination with the multimedia players provided thereon, which provides convenience to the users.

Since there are stores in public occasions such as airports, passengers usually will buy some goods. Especially when there are tax-free stores in the airports, passengers will usually buy more goods. Most current trolleys are merely provided with a trolley frame base for placing luggage without any storage space for the passengers to place the goods they bought, which thus cause the passengers to carry the goods with hands or stack the goods on the luggage. When the passenger carries various shopping bags with one hand and pushes the trolley with the other hand, if the luggage is relatively heavy, the trolley may easily overturn during turning or ascending and descending. The goods are easy to slide when being placed on the luggage, causing damage to the goods. Therefore, it is an urgent problem to provide a trolley with a storage unit to facilitate the passengers to place the goods they bought.

SUMMARY

In view of the problems existing in the prior art, the present invention provides a trolley for carrying articles, including a base for carrying articles with wheels; a trolley frame fixedly connected to the base and extending upwards, the trolley frame forming a baffle at the front side of the base, the trolley frame including an upper portion, a middle portion and a lower portion, wherein the lower portion is connected to the front end of the base, the middle portion is provided with a foldable storage unit, and the upper portion is provided with a handle; and the base and the trolley frame form a carrying space, the foldable storage unit is provided with a retracted location and an unfolded location, and when the foldable storage unit is in the unfolded location a storage space formed by the foldable storage unit occupies a part of the carrying space.

In addition to the carrying space, the trolley provided according to the invention may also be formed with a storage space by a foldable storage unit. The user may decide to unfold or retract the storage unit as necessary to properly place the articles being carried.

In some embodiments of the invention, the storage space formed by the foldable storage unit in the retracted location is substantially zero. A storage space formed by the foldable storage unit in the unfolded location is substantially of a bucket shape or a box shape.

In some embodiments of the invention, the foldable storage unit comprises a rigid frame pivotally connected to the trolley frame.

In some embodiments of the invention, the middle portion of the trolley frame is provided with a snap-fit device, and when the foldable storage unit is in the retracted location, at least a part of the rigid frame is fixed to the snap-fit device in a mating manner. The frame of the storage unit can be effectively avoided from being suddenly separated from the trolley frame causing damage to the articles.

In some embodiments of the invention, the rigid frame is covered with a soft material at the sidewalls thereof.

In some embodiments of the invention, the rigid frame extends to form a handheld handle.

In some embodiments of the invention, the rear end of the base is provided with a stopper for blocking the movement of the articles to better place large articles.

In some embodiments of the invention, the bottom of the base is provided with a power supply device, the handle is provided with a power supply port which is connected with the power supply device through electrical wires provided in the trolley frame. The power supply port is used for supplying power to electronic devices fixedly connected thereto or charging portable electronic devices, such as mobile phones, tablets and so on.

In some embodiments of the invention, the power supply port is connected to an electronic auxiliary device.

The trolley for carrying articles according to the invention s provided with a foldable storage unit and the frame of the storage unit is connected to the trolley frame through a soft material. When the storage unit is in use, it may unfold to form a storage space, and when the storage unit is not in use, the frame can be pushed to press the storage unit closely against the trolley frame without occupying the carrying space formed between the trolley frame and the base. In addition, such a trolley is also provided with a multimedia electronic device which can navigate or play audio and video files for the user. The user can decide whether to use the storage unit of the trolley according to the actual situation of the articles being carried with and the shopping needs. The trolley can be prevented from overturn when the user pushes the trolley with one hand and carries articles with the other hand.

DETAILED DESCRIPTION

Figure 1:
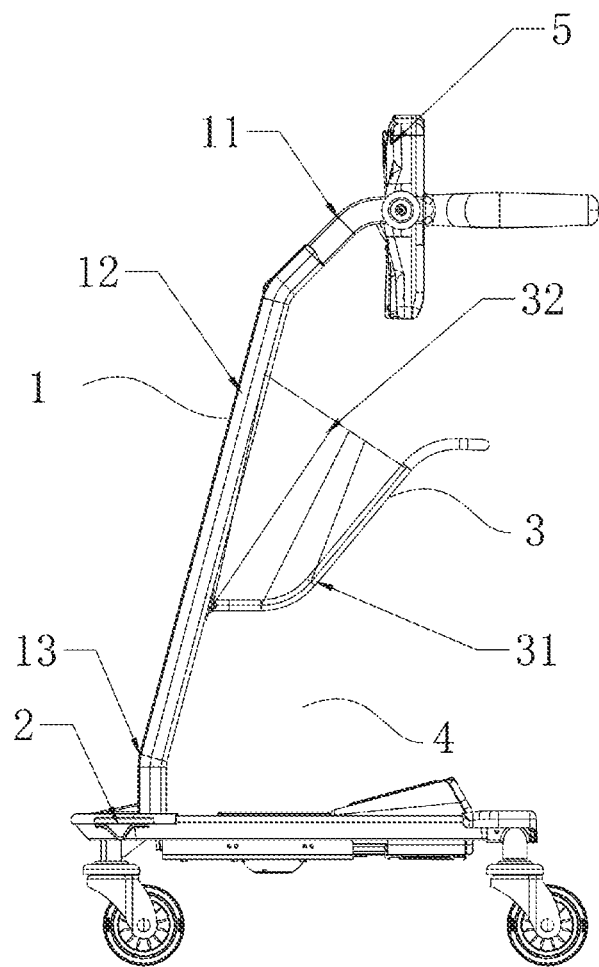
FIG. 1 is a schematic diagram of a trolley according to an embodiment of the invention with a storage unit being in an unfolded location.
Figure 2:
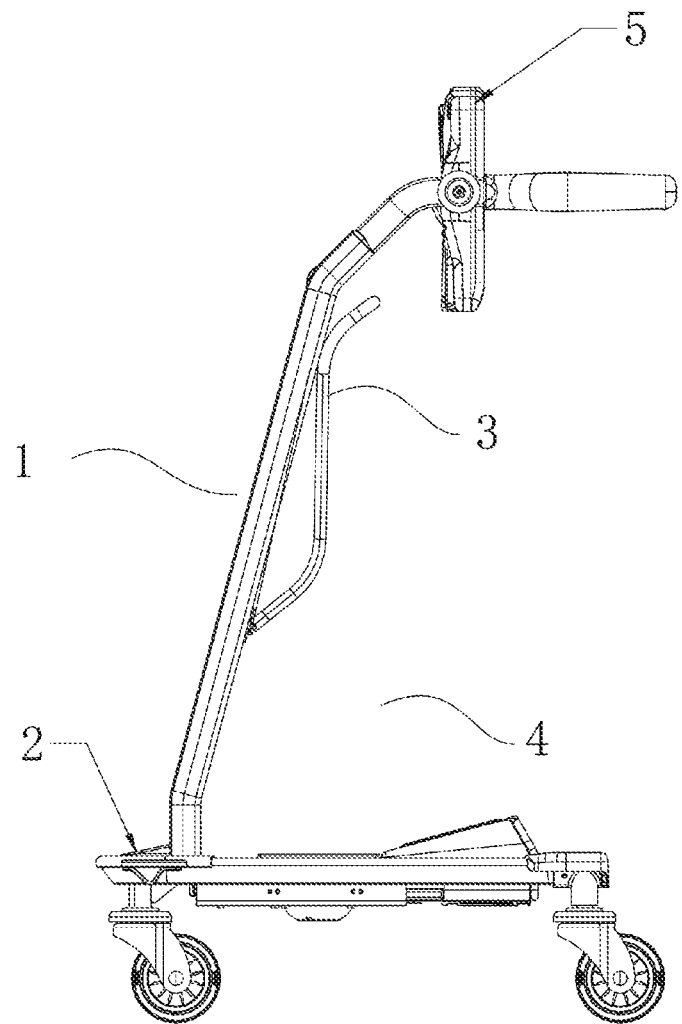
FIG. 2 is a schematic diagram of a trolley according to an embodiment of the invention with a storage unit being in a retracted location.
Figure 3:
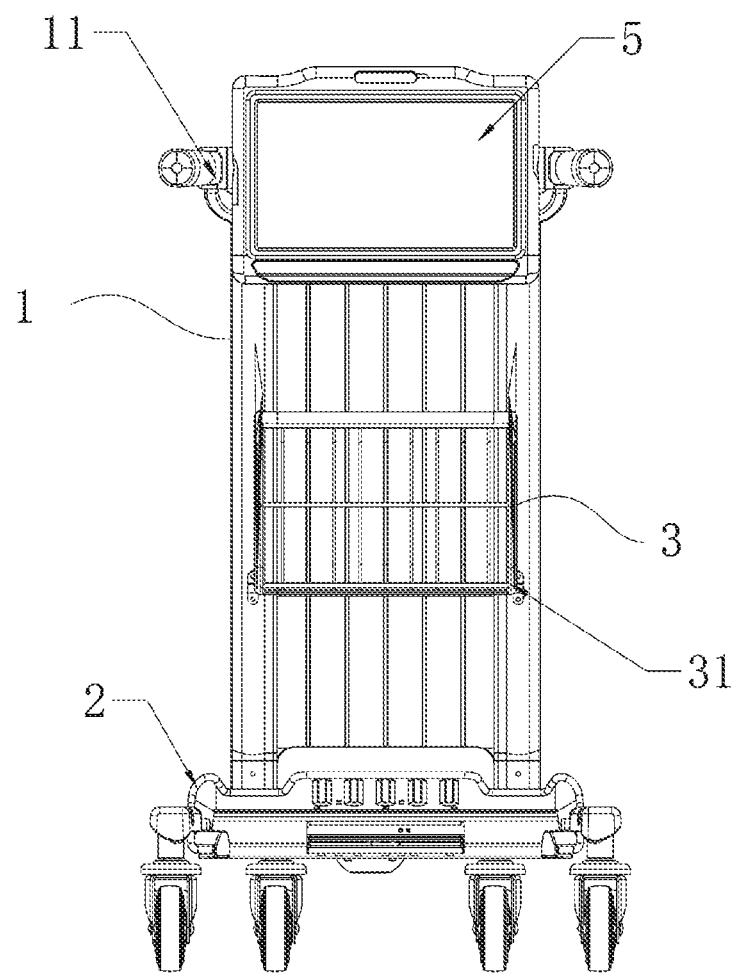
FIG. 3 is a front view of a trolley according to an embodiment of the invention.
Figure 4:
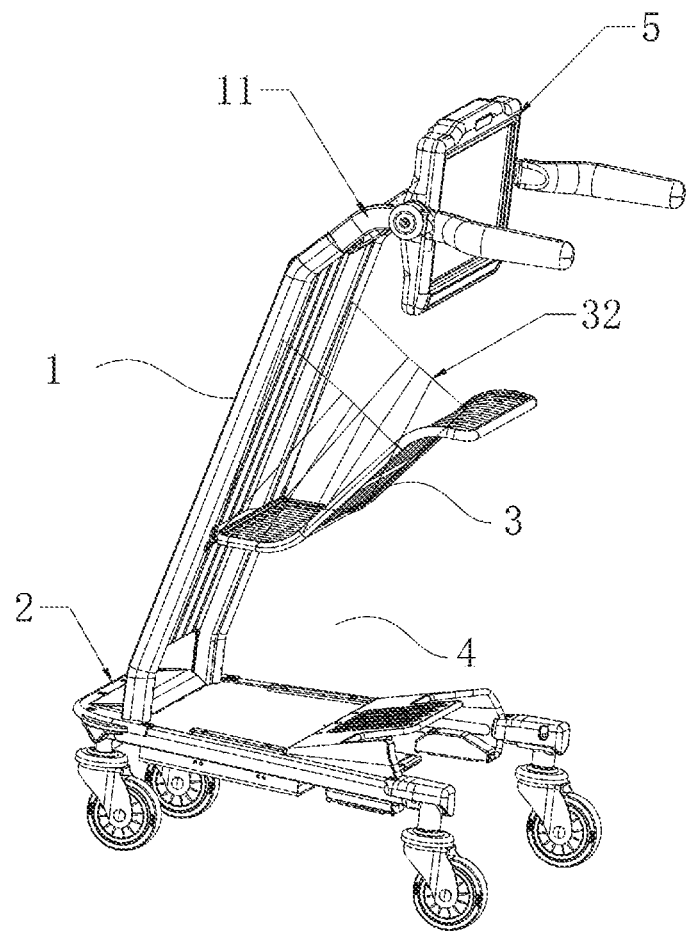
FIG. 4 is a perspective view of a trolley according to an embodiment of the invention.

FIG. 1 shows a multimedia trolley according to an embodiment of the invention with a locking mechanism. As shown in FIGS. 1 to 4, a trolley according to an embodiment of the invention mainly includes a trolley frame 1, a base 2 with wheels and a foldable storage unit 3. The trolley frame 1 includes an upper portion 11, a middle portion 12 and a lower portion 13. The lower portion 13 of the trolley frame 1 is connected to the front end of the base 2 and extends upwards to form the middle portion 12. The upper portion 11 of the trolley frame 1 is connected to the middle portion 12 and extends towards the rear end of the base 2 in an arc shape. The foldable storage unit 3 is provided above the middle portion 12 of the trolley frame 1. A carrying space 4 is formed between the trolley frame 1 and the base 2. Articles can be placed on the base 2. The trolley frame 1 can be used as a baffle for preventing the articles from sliding out forwards under the action of inertia during accidental braking. The foldable storage unit 3 is provided in the carrying space 4. When the foldable storage unit 3 is in a retracted location, it does not substantially occupy the carrying space 4 so that more large articles can be placed on the base 2. When the foldable storage unit 3 is in an unfolded location, it forms a storage space, and accordingly the carrying space 4 will be reduced. If the user does not carry too many large articles, the storage unit 3 can be unfolded so that the small articles purchased or carried by the user can be placed therein. The user does not need to carry articles with one hand and push the trolley with the other hand, thus avoiding the trolley from overturn during ascending and descending or turning.

In order to facilitate use, the middle portion 12 of the trolley frame 1 inclines to the rear end of the base 2 so that the upper portion 11 of the trolley frame 1 connected thereto extends towards the rear end of the base 2 in an arc shape to form a handle. The upper portion 11 exceeds the base 2 in the vertical direction after extension so as to make it convenient for a user to push. Of course, the upper portion 11 of the trolley frame 1 may also not project beyond the base 2, instead, a dedicated handle is installed thereon to achieve the same effects as the above embodiment.

The storage unit 3 includes a rigid frame 31 and a soft material 32 covering the sidewalls of the rigid frame 31. One end of the rigid frame 31 is hinged with the middle portion 12 of the trolley frame 1 so that it can rotate within a certain angle. When the foldable storage unit 3 is in a retracted location, the soft material 32 covering the sidewalls may shrink to form wrinkles. At this moment, the storage unit 3 does not substantially occupy the carrying space 4. When the foldable storage unit 3 is in an unfolded location, the soft material 32 covering the sidewalls may be tensioned to form a bucket-shaped storage space. Due to the formation of the storage space, the carrying space is reduced. The rotation angle of the rigid frame 31 depends on the length of the soft material of the sidewalls. When the soft material reaches the maximum tension length, the rigid frame 31 reaches the maximum rotation angle. In addition, a snap-fit device (not shown) capable of mating with the rigid frame 31 may also be provided on the middle portion of the trolley frame 1. When the foldable storage unit is in a retracted location, at least a part of the rigid frame 31 is fixed by the snap-fit device. As shown in the figure, in this embodiment, the rigid frame 31 is substantially of an "S" shape, and the material thereof may be aluminium alloy. The soft material may be cloth with good abrasive resistance such as canvas, non-woven fabrics and so on.

The storage unit of such a trolley may be folded and retracted when not in use. A user may decide how to use the carrying space and the storage space according to the size of the articles being carried. Such a special design provides great convenience to the user.

Figure 5:
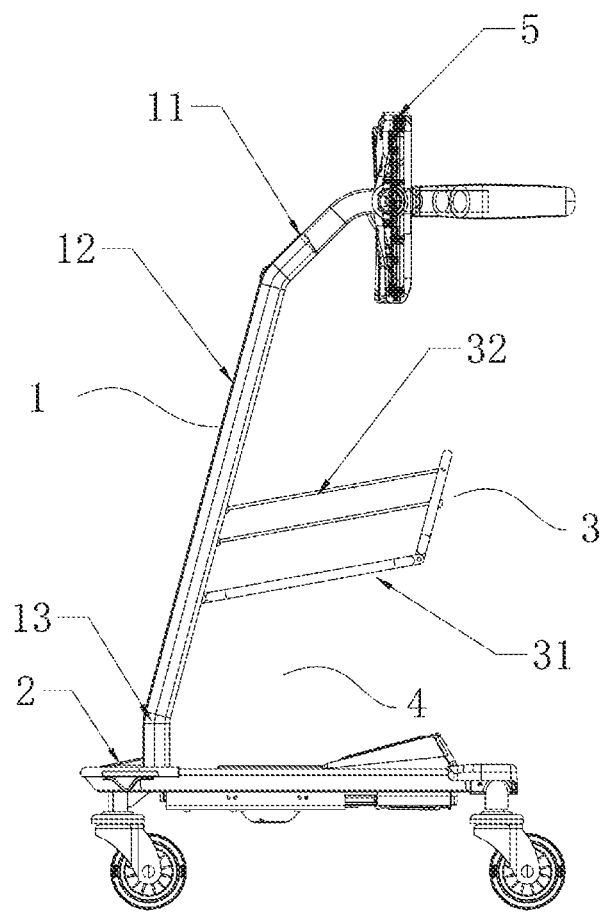
FIG. 5 is a schematic diagram of a trolley according to another embodiment of the invention with a storage unit being in an unfolded location.
Figure 6:
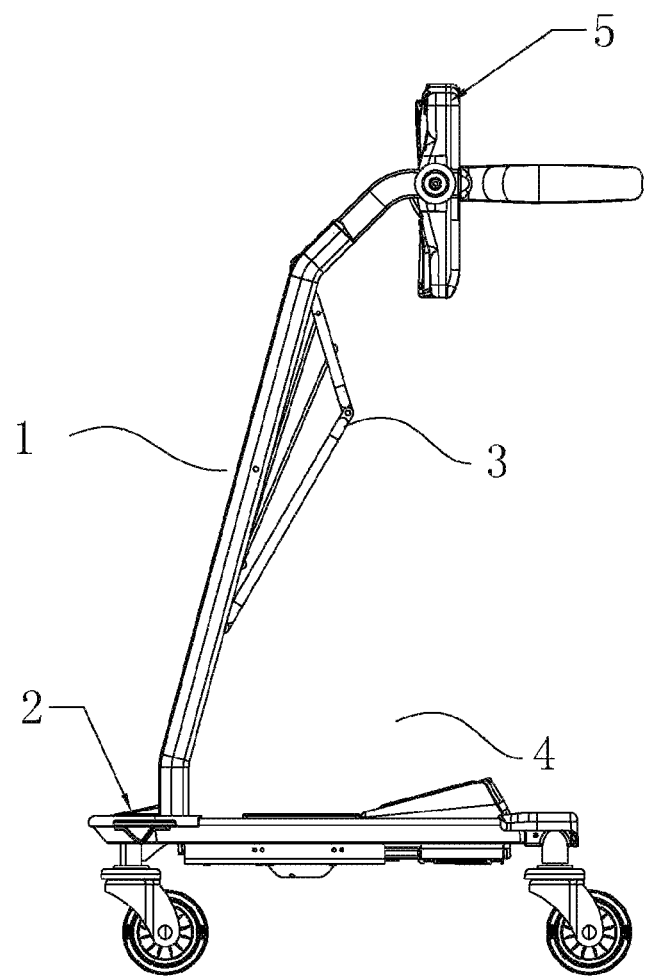
FIG. 6 is a schematic diagram of a trolley according to another embodiment of the invention with a storage unit being in a retracted location.
Figure 7:
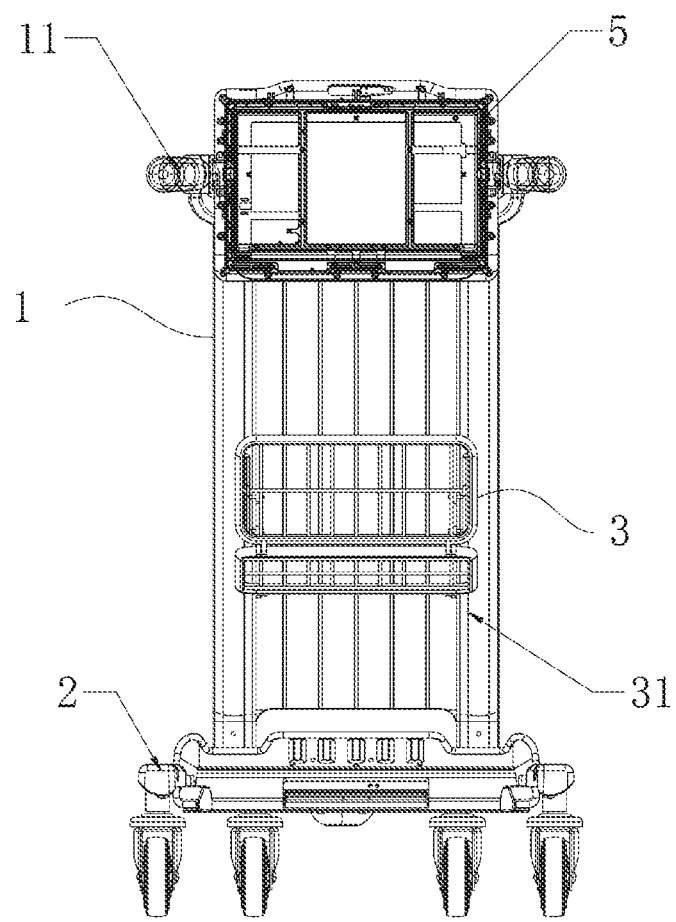
FIG. 7 is a front view of a multimedia trolley according to an embodiment of the invention.

A trolley according to another embodiment of the invention is shown in FIGS. 5 to 7. The difference from the above embodiment lies in that the rigid frame 31 of the foldable storage unit 3 has two portions which are hinged fixedly and may form a certain angle when the rigid frame 31 is unfolded. At this moment, the storage space formed by the storage unit 3 is of a box shape. When the storage unit 3 is in a retracted location, the rigid frame 31 can be closely pressed against the middle portion 12 of the trolley frame 1 and fixed by the snap-fit device.

In this embodiment, the rear end of the base 2 is provided with a stopper for preventing articles from sliding out of the base 2. In addition, the base 2 is also provided with a power supply device. The upper portion 11 of the trolley frame 1 is provided with an electronic auxiliary device 5. The power supply device and the electronic auxiliary device 5 are electrically connected through the electrical wires provided in the trolley frame. Such an electronic auxiliary device 5 may be a multimedia player for playing audio or video. The electronic auxiliary device 5 is pivotally connected to the upper portion 11 of the trolley frame 1 so as to be capable of rotating within a certain angle to meet the viewing needs of a user from different perspectives. In order to make it convenient for installation and transport, the upper portion 11, the middle portion 12, the lower portion 13 of the trolley frame 1 and the base 2 are designed separately. During assembling, they may be plugged first and then fastened through bolts, which is not only convenient, but also more artistic by avoiding the exposure of the bolts.

Those skilled in the art may understand that the stopper, the electronic auxiliary device and the connection methods in this embodiment may be applied to the first embodiment above. In this embodiment, the rigid frame 31 of the storage unit 3 may also have more than two segments as long as it can be closely pressed against the trolley frame 1 to avoid occupying too much of the carrying space 4 when the storage unit 3 is not in use. Of course, depending on the soft material, the formed storage space is not limited to a bucket shape or a box shape.

Various embodiments of the invention are described in detail above. Those skilled in the art may understand that various modifications, changes and variations may be made to the embodiments without departing from the scope of the invention as defined by the appended claims. The scope of the claims shall be explained as a whole and conforms to the broadest scope consistent with the description, which is not limited to examples or implementation models in the detailed description.

What is claimed is:

1. A trolley for carrying articles, comprising:
   a base for carrying articles with wheels;
   a trolley frame fixedly connected to the base and extending upwards, the trolley frame forming a baffle at the front side of the base, the trolley frame comprising an upper portion, a middle portion and a lower portion, wherein the lower portion is connected to the front end of the base, the middle portion is provided with a foldable storage unit, and the upper portion is provided with a handle; and the base and the trolley frame form a carrying space, the foldable storage unit is provided with a retracted location and an unfolded location, and when the foldable storage unit is in the unfolded location, a storage space formed by the foldable storage unit occupies a part of the carrying space, wherein the foldable storage unit comprises a rigid frame pivotally connected to the trolley frame, the rigid frame selected from a group consisting of a single piece with an "S" shape and at least two frame portions hinged fixedly and forming a certain angle when the rigid frame is unfolded.

2. The trolley according to claim 1, wherein the storage space formed by the foldable storage unit in the retracted location is substantially zero.

3. The trolley according to claim 1, wherein a storage space formed by the foldable storage unit in the unfolded location is substantially of a bucket shape or a box shape.

4. The trolley according to claim 1, wherein the middle portion of the trolley frame is provided with a snap-fit device, and when the foldable storage unit is in the retracted location, at least a part of the rigid frame is fixed to the snap-fit device in a mating manner.

5. The trolley according to claim 1, wherein the rigid frame is covered with a soft material at the sidewalls thereof.

6. The trolley according to claim 1, wherein the rigid frame extends to form a handheld handle.

7. The trolley according to claim 1, wherein the rear end of the base is provided with a stopper for blocking the movement of the articles.

8. The trolley according to claim 1, wherein the bottom of the base is provided with a power supply device, the handle is provided with a power supply port, and the power supply device and the power supply port are electrically connected through the electrical wires provided in the trolley frame.

9. The trolley according to claim 8, wherein the power supply port is connected to an electronic auxiliary device.

10. The trolley according to claim 1, wherein the rigid frame comprises the single piece with the "S" shape.

11. The trolley according to claim 1, wherein the rigid frame comprises the at least two frame portions.

12. The trolley according to claim 11, wherein the at least two frame portions includes more than two frame portions.

* * * * *